Figure 3:
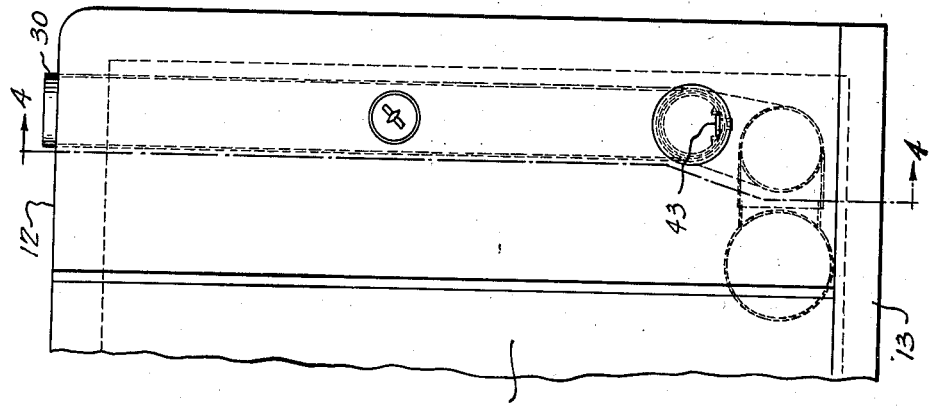

April 1, 1941.  L. D. HOULIS  2,236,755

BAKING OVEN

Filed Aug. 19, 1939  4 Sheets-Sheet 1

INVENTOR.
Louis D. Houlis
BY
ATTORNEY.

April 1, 1941.  L. D. HOULIS  2,236,755
BAKING OVEN
Filed Aug. 19, 1939   4 Sheets-Sheet 2
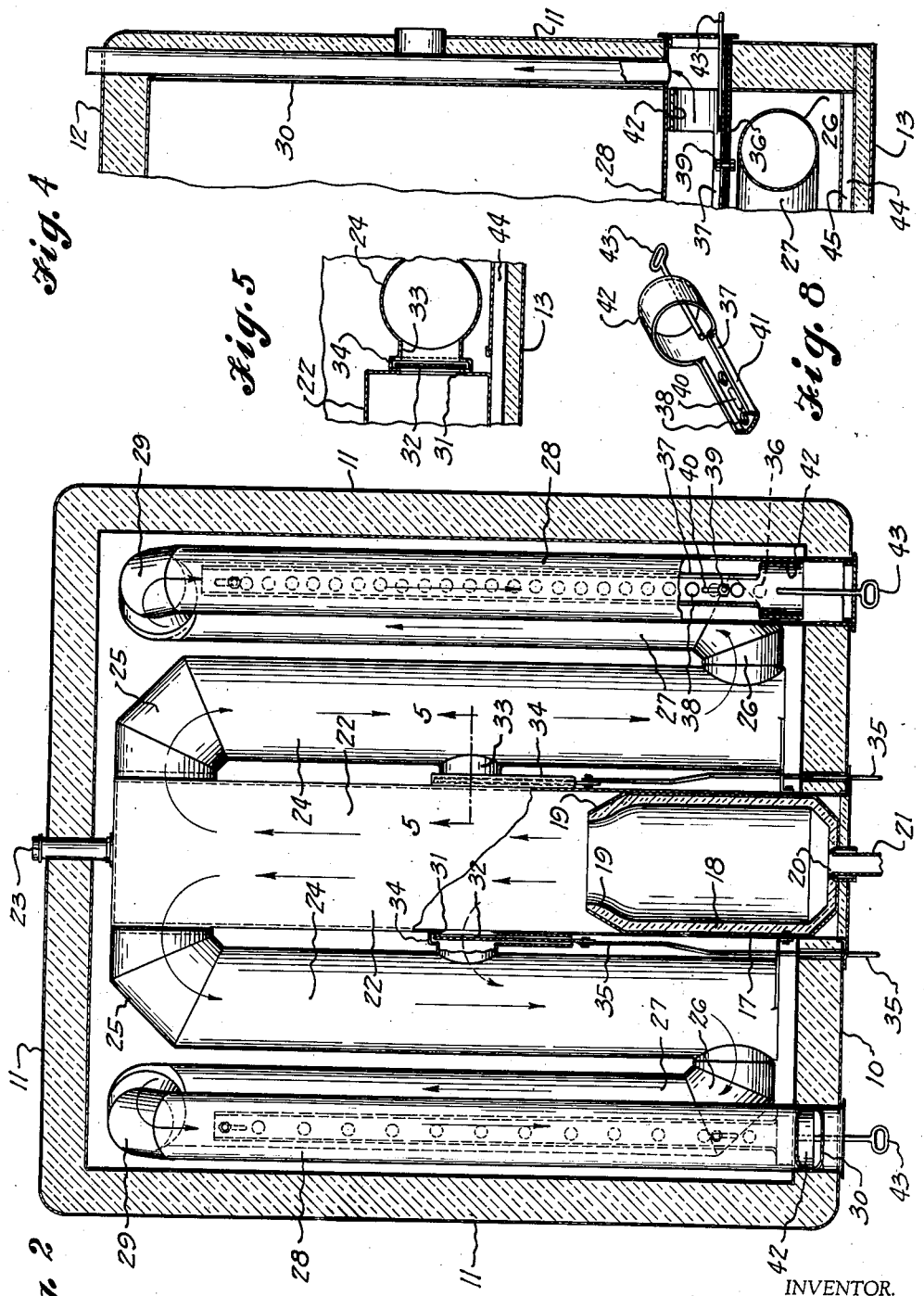
INVENTOR.
Louis D. Houlis
BY
ATTORNEY.

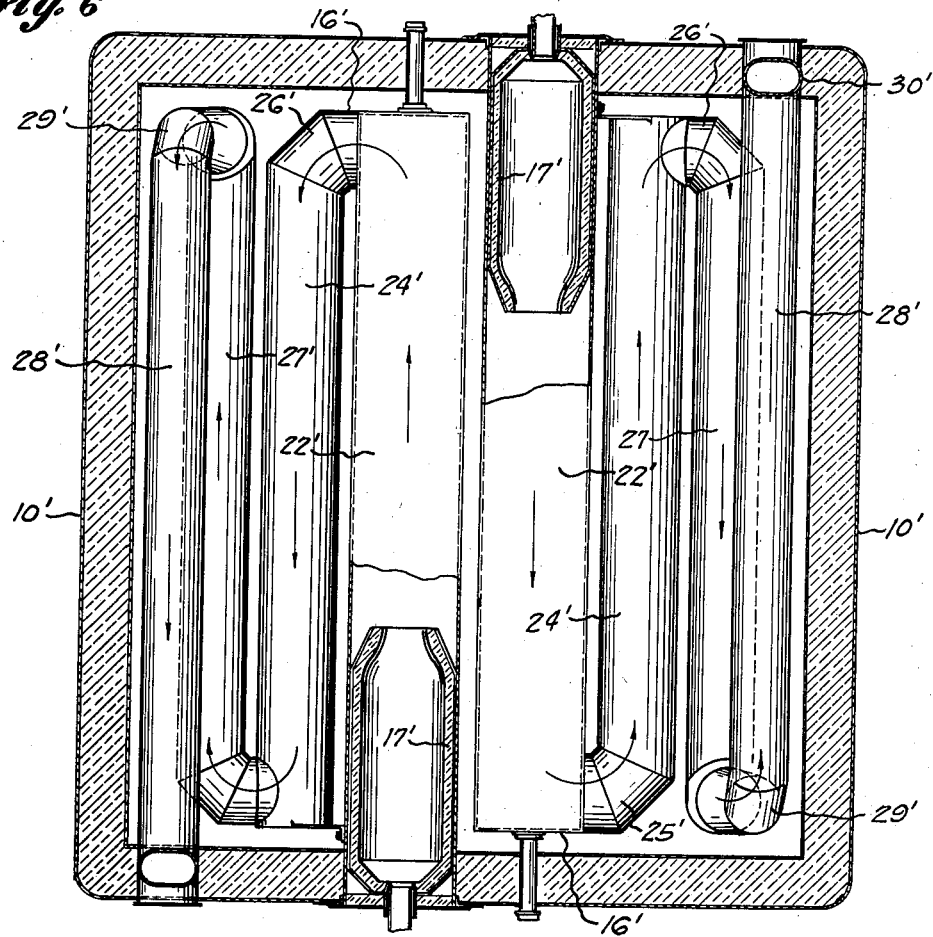
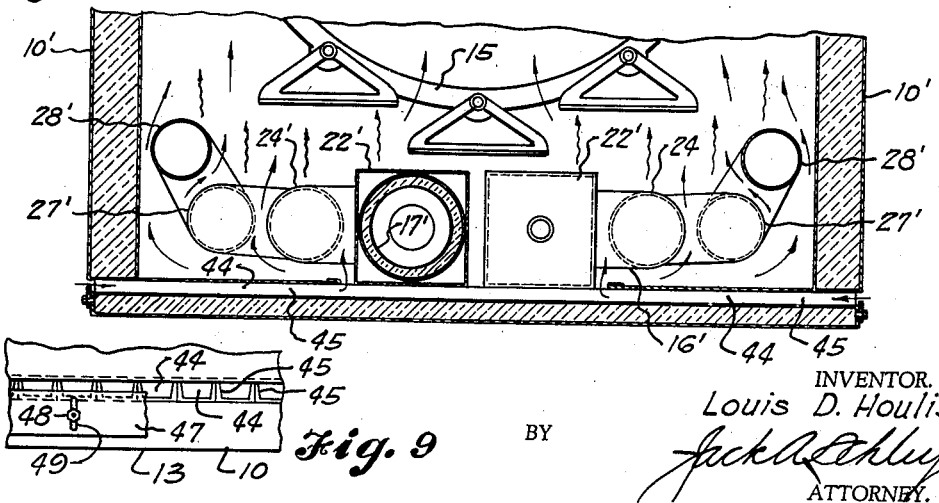

INVENTOR
Louis D. Houlis
BY
ATTORNEY

Patented Apr. 1, 1941

2,236,755

UNITED STATES PATENT OFFICE 2,236,755

BAKING OVEN

Louis D. Houlis, Cincinnati, Ohio

Application August 19, 1939, Serial No. 291,065

19 Claims. (Cl. 107—59)

This invention relates to new and useful improvements in baking ovens.

One object of the invention is to provide an improved baking oven having means for rapidly circulating hot gases throughout the lower end of the interior of the oven, whereby said interior is quickly and efficiently heated.

A particular object of the invention is to provide a baking oven having an improved firing or heating unit which is so arranged that the gases are heated in the central portion of the oven and simultaneously circulated to the sides of said oven, whereby the same is evenly heated; there being means provided at each side of the oven for exhausting cooled spent gases therefrom.

Another object of the invention is to provide an improved heating unit for a baking oven which includes a firebox connected with a flue system having branch ducts for rapidly and evenly heating the interior of the oven, a portion of the heated gases escaping from the firebox being permitted to directly enter the branch ducts to distribute the same, whereby the heating of said oven will be more evenly and efficiently performed.

An important object of the invention is to provide an improved firebox which is made separately and then mounted within the flue system so that it may be quickly and readily removed for repair or replacement, the construction of the firebox being such that its external surface contacts the metallic walls of the flue system at a minimum number of points and the major portion of its exterior is exposed and spaced from said walls, whereby fresh air may circulate between said firebox and walls so as to cool the former and prevent overheating thereof.

A further object of the invention is to provide an improved heating unit, of the character described, which may be mounted in any type of baking oven with desirable results and increased efficiency and which is rapidly and evenly heated so as to heat the fresh air entering the lower portion of the oven.

Still another object of the invention is to provide a baking oven having an improved fresh air duct which is located beneath the floor thereof and which is so arranged that fresh air is drawn from the exterior of the oven and delivered to the central portion of its interior in close proximity to the firebox, whereby said fresh air is immediately heated and is circulated through the baking portion of said oven; there being means provided for varying the inlet opening of said duct so as to regulate the amount of fresh air entering the same.

A still further object of the invention is to provide an improved flue system for a baking oven which is so constructed that a portion of the heated gases may be introduced or bled into the interior of said oven, whereby the efficiency thereof is materially increased.

A construction designed to carry out the invention will be hereinafter described, together with other features of the invention.

Figure 1:
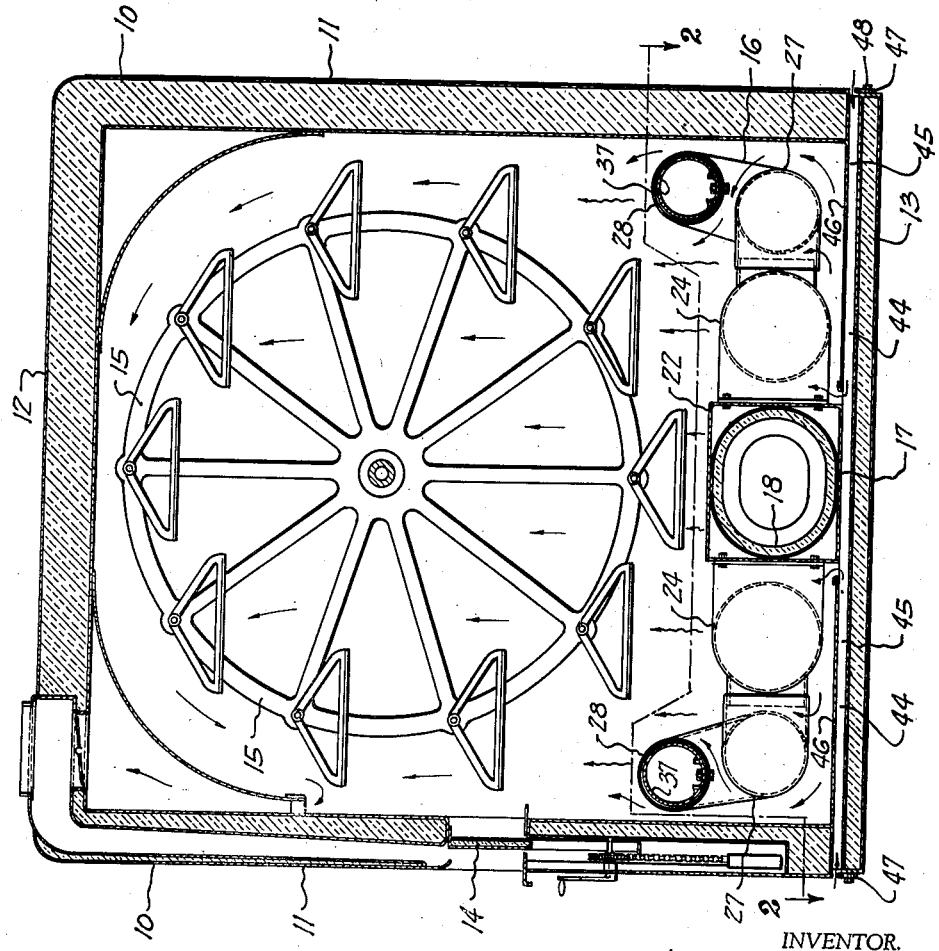
Figure 10:
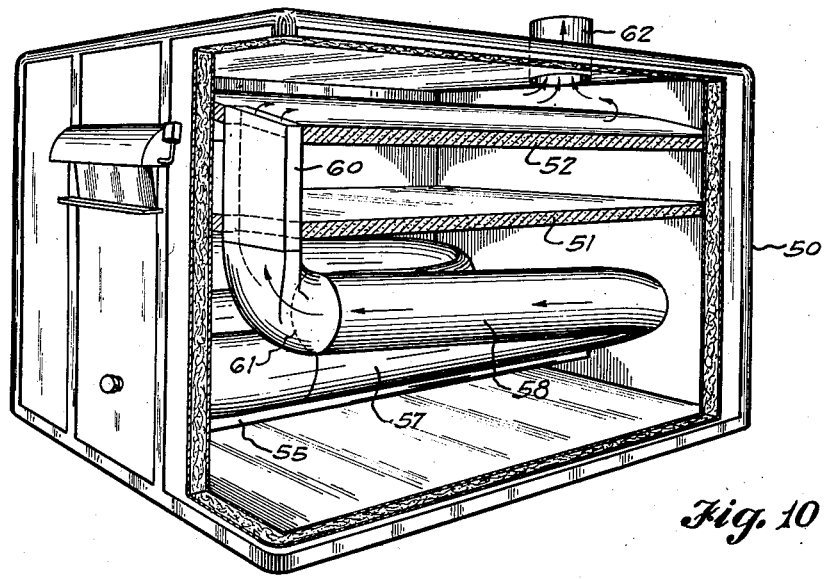
Figure 11:
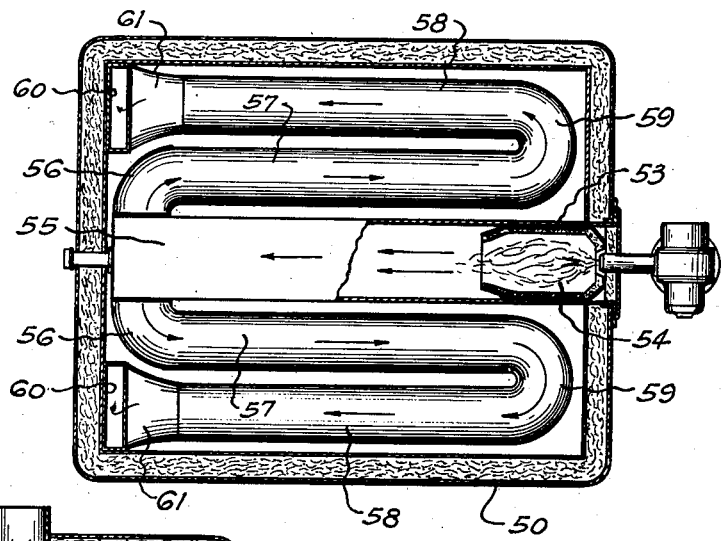
Figure 12:
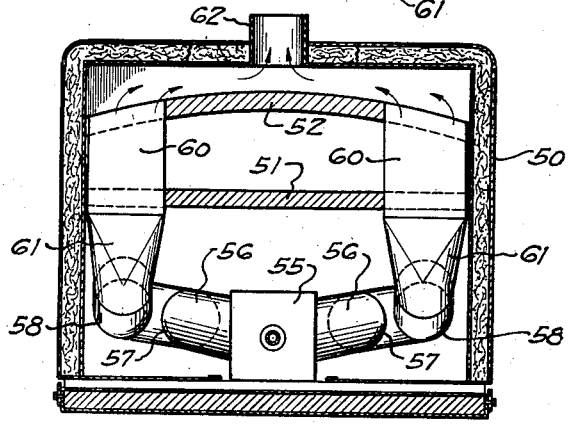

The invention will be more readily understood from a reading of the following specification and by reference to the accompanying drawings, in which the example of the invention is shown, and wherein:

Figure 1 is a transverse, vertical, sectional view of a baking oven constructed in accordance with the invention, Figure 2 is a view, partly in elevation and partly in section, taken on the line 2—2 of Figure 1, showing the arrangement of the heating unit, Figure 3 is a side elevation of a portion of the oven, showing one of the exhaust flues, Figure 4 is a transverse, vertical, sectional view, taken on the line 4—4 of Figure 3, Figure 5 is a transverse, vertical, sectional view, taken on the line 5—5 of Figure 2, showing the construction of one of the dampers, Figure 6 is a view, similar to Figure 2, of a modified form of heating unit mounted in a similar oven, Figure 7 is a view, partly in elevation and partly in section, of the lower portion of the oven, showing the arrangement of the flue system, Figure 8 is an isometric view of a portion of the slide valve, Figure 9 is an enlarged detail view, partly in elevation and partly in section, of the fresh air duct and its control means, Figure 10 is an isometric view of a deck type of oven having a portion broken away to show the heating unit which is a slightly modified, Figure 11 is a horizontal, cross-sectional view of the oven with the heating unit being shown partly in elevation and partly in section, and Figure 12 is a transverse, vertical, sectional view of this modified form.

In the drawings, the numeral 10 (Figure 1) designates an oven which may be of any desired shape or structure, although it has been shown as being substantially rectangular in shape. The oven has the usual walls 11, top 12 and bottom 13 which may be insulated by refractory material or other suitable insulation. A vertically sliding door 14 is provided in the front wall for easy accessibility to the interior of the oven within which the conventional revolving reel 15, which receives the articles to be baked, is disposed. A heating unit 16 is mounted on the floor of the oven beneath said reel.

The heating unit is one important feature of the invention and includes a fire-box 17, which is positioned at one end of the oven near the wall thereof. The firebox is substantially oval or elliptical in cross-section and is lined with a suitable refractory material 18, such as plastic brick or other suitable material. The inner end of the firebox is reduced, as shown at 19, whereby the outlet thereof is also reduced, as shown in Figure 2, while a small Venturi opening 20 which receives the nozzle 21 of a burner (not shown) is provided in the outer end of said firebox. This burner may be of any suitable construction and includes a blower (not shown) of sufficient capacity to mix the fuel being injected with a certain amount of oxygen and force the mixture through the opening 20 into the firebox, wherein it is completely combusted and then expelled therefrom through the reduced outlet opening 19.

The firebox is adapted to be mounted within one end of a horizontal metallic duct 22 which is substantially rectangular in cross-section and which extends longitudinally across the central portion of the oven adjacent its floor or bottom. The duct has its opposite end closed and terminating short of the opposite end wall to which it may be secured by a suitable support 23. The elliptical shape of the firebox 17 prevents the entire exterior thereof from engaging the internal rectangular surface of the duct without sacrificing necessary contact points therebetween which are essential for the proper positioning of said firebox. The difference in contours of the members also makes possible a plurality of air spaces therebetween, whereby circulation of air between said members is permitted and overheating of the same is prevented. It is pointed out that due to the reduced opening 19 of the firebox, the extremely hot gases which are expelled from said firebox into the duct do not strike or contact said duct until the force of said gases has been considerably lessened.

A pair of longitudinal, metallic, tubular pipes 24 are disposed on opposite sides of the duct 22 in parallel relation and have connection with the closed end of said duct by means of suitable elbows 25 which are suitably mounted in the side walls of said duct. The pipes are supported above the floor of the oven and each is connected by a laterally extending elbow 26 to a parallel pipe 27 of smaller diameter. A third pipe 28 is disposed above each pipe 27 and communicates therewith through an elbow 29 which is positioned between their ends. The flue 22 and pipes 24, 27 and 28 conduct the hot gases, expelled from the firebox, back and forth longitudinally over the floor of the oven and said flue and pipes, being constructed of metal, permit the heat from said gases to radiate upwardly within said oven. The discharge ends of the pipes 28 are connected to the lower ends of vertical outlet risers 30 which extend upwardly within one end wall, as is clearly shown in Figure 4.

In order to more quickly circulate the hot gases through the heating unit, the duct 22 is provided intermediate its ends with a pair of opposed openings 31 which are arranged to be closed by damper plates 32. A short, transverse tube or tubular conduit 33 is carried by each pipe 24 and has its free end surrounding one of the openings 31, whereby communication is established between the duct and said pipes. The dampers 32 engage within rectangular guideways 34 which are made integral with the tubes or conduits and which project longitudinally therefrom. An operating rod or lever 35 is connected to each damper and extends through the end wall of the oven, whereby the dampers may be regulated exteriorly of said oven. By partially opening one or both of the dampers, a portion of the hot gases may escape into the pipes 24 so as to heat said pipes and the other pipes at the same time that the far end of the duct 22 is heated. With this arrangement, the products of combustion may pass to the pipes 24 without traversing the entire length of the duct 22 and, therefore, a more rapid and even heating of the oven is possible upon initial ignition of the burner (not shown). The provision of these dampers also tends to prevent preliminary overheating of the duct.

A plurality of alined, spaced openings 36 are provided in the lower surface of each pipe 28 so as to establish communication between the interior of said pipe and the oven. The openings of each pipe are arranged to be closed by an elongate slide valve 37 mounted within the pipe and having openings 38 which are complementary to said openings and which are adapted to be moved into registration therewith (Figure 2). Each valve is, preferably, fastened to its respective pipe by suitable bolts and nuts 39 which extend through the lower surface of said pipe and engage within longitudinal slots 40 formed in said valve. The longitudinal marginal edge portion of each valve is bent upwardly at a right angle as shown at 41 for the sake of rigidity. An annular collar 42, having an external diameter substantially equal to the internal diameter of the pipes 28, is made integral with the outer end of each valve as shown in Figure 8 and is provided for the purpose of shutting off or partially shutting off communication with the risers 30 when moved outwardly. A suitable operating rod or lever 43 is connected to the collar of each valve and extends through the end wall of the oven, whereby the valves may be regulated exteriorly of said oven. By sliding one or both of the valves outwardly a slight distance, the openings 36 are partially opened and the risers 30 partly closed, whereby a portion of the gases may escape or bleed into the interior of the oven to increase the efficiency thereof. This adjustment is usually made after the entire flue system has been thoroughly heated, whereby any danger of smoke or soot entering the oven is obviated. By this bleeding arrangement, it is possible to utilize all of the heat of the products of combustion so as to maintain a constant temperature within the oven with less fuel consumption.

A fresh air duct 44 is provided on each side of the firebox 18 and central flue 22 between the floor 13 and heating unit 16. The ducts extend substantially throughout the length of the oven, one from the front wall and the other from the rear wall as shown in Figure 1. It is pointed out that the ducts are provided for the purpose of conducting fresh air from the exterior of the oven to the interior thereof and that their inner ends terminate short of the firebox and flue so that the air may escape through the opening therebetween. Each duct is formed of a plurality of inverted parallel channel irons 45 which extend from the outer wall to the central portion of the oven and which are supported by the floor thereof, as is clearly shown in Figure 9. A flat metallic sheet 46 is disposed above and lies contiguous to the upper surfaces of each set of channel irons so as to complete the ducts and to form a false bottom for the oven.

For regulating the amount of fresh air admitted into the oven by the ducts, an elongate, longitudinally-extending plate 47 is provided at the outer end of each duct. These plates extend throughout the width of the ducts and are slidably secured to the front and rear edges of the floor 13, by a plurality of bolts 48 which are fastened within said floor and which extend through vertical slots 49 formed in said plates. It is manifest that by moving the plates 47 upwardly and downwardly to decrease and enlarge the outer openings of the ducts 44, the amount of fresh air drawn into the oven may be varied. It is noted that this fresh air, upon entering the oven, is immediately heated so as to supply fresh hot air to the baking chamber of said oven, thereby providing quicker and more efficient heat exchange and better circulation therein.

In operation, the force of the fan or blower of the burner (not shown) is employed to inject the fuel with a certain amount of oxygen. Substantially complete combustion takes place within the firebox and the hot gases are ejected from said box into the enlarged duct 22. The reduced inner portion 19 of the firebox prevents the hot gases from touching the metallic walls of the duct immediately upon release from said firebox, whereby the force of said gases is considerably lessened before they contact said walls. The particular shape of this inner end also tends to reflect a shadow in the immediate vicinity of the outlet of the hot gases, whereby "firebox reflection" is prevented and the outer end of the entire heating unit is kept cooler.

The hot gases then travel from the far end of the oven through the pipes 24, 27 and 28 in the direction of the arrows, as shown in Figure 2. During their travel the heat of these gases is radiated from the walls of the pipes and by the time said gases reach the risers 30, they have cooled considerably. The cooled, spent gases pass upwardly so as to escape through the risers and in doing so tend to cool the wall in which they are mounted.

Fresh air may be drawn into the interior of the oven through the ducts 44 as has been hereinbefore set forth in regulated quantities by adjusting the plates 47. After the entire flue system has become heated, a portion of the hot gases may be bled into the oven through the openings 36 to increase the efficiency thereof.

This heating unit produces a maximum efficiency with a minimum of waste heat and its comparative freedom from moving parts and auxiliary elements makes for its simplicity. It is pointed out that the firebox 17 is the only part of the entire unit which is made of refractory material and that this element is made separately so that it may be readily removed for repair or replacement. It is also pointed out that the major portion of the firebox's exterior is spaced from and does not contact the walls of the duct, whereby fresh air may circulate therearound to prevent excessive heating and burning out of the same. Since the duct and pipes are formed of uninsulated metal, radiation and efficiency is increased.

In Figures 6 and 7, a modified form of the invention is shown mounted in a larger oven 10' of the same type. This form includes a pair of heating units 16' and a separate firebox 17' for each unit which fireboxes are mounted in opposite ends of the oven. It is pointed out that the boxes are round in cross-section instead of being elliptical or oval as the firebox of the first form, while the ducts 22' are substantially square, as shown in Figure 7. Manifestly, the same principle of air circulation and cooling of the fireboxes is present in this form as in the first form of the invention. The closed or far end of each duct is connected to a sinuous flue which is similar to the first flue and which includes the pipes 24', 27' and 28', the elbows 25', 26' and 29' and the outlet riser 30'. In other words, instead of the pipes 24' being connected to opposite sides of a single duct, a pair of ducts having individual fireboxes are provided for accomplishing the same result. Obviously, the dampers 32 are unnecessary in this form, as each heating unit may be individually controlled.

In Figures 10, 11 and 12, another form is shown, wherein the invention is mounted within a "deck" type of oven 50. Instead of the reel 15, this oven has a deck or shelf 51 and a slightly arched dome 52. The heating unit 53, similar to the heating unit 16 of the first form, is mounted beneath the deck on the floor of this oven and includes a firebox 54 which is round in horizontal cross-section. A square duct or flue member 55 engages over the inner end of the firebox and has its opposite end connected by a pair of elbows 56 to a pair of opposed sinuous flues 57. Each flue includes a plurality of longitudinal tubular pipes 58 which are connected by elbows 59 at their ends for conducting hot gases back and forth longitudinally over the floor of the oven. An outlet riser 60 communicates with the discharge end of each flue 57 through a suitable elbow 61 and said risers extend vertically up through the deck 51 and dome 52. The cooled or spent gases escaping from the risers pass longitudinally above the dome to a suitable stack 62 mounted in the top of the oven adjacent its opposite end. It is apparent that the operation of this form of the invention is the same as that of the other forms and that after the products of combustion heat the lower portion of the oven by radiation, they pass upwardly and are discharged from the upper end thereof.

It is noted that the two modified forms of the invention as shown in Figures 6 and 7 and 10 and 12, respectively, include the fresh air ducts 44 and regulating plates 47. However, neither of these forms have been shown as provided with the sliding valve 37 for bleeding a portion of the hot gases into the oven, although either might be constructed with the same as a part thereof.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent, is:

1. A heating unit for an oven including, a firebox, and a metallic flue connected with the outlet end of the firebox for receiving and circulating hot gases through the oven, the inner end of the flue engaging around and having the major portion of its interior spaced from said box, whereby fresh air may circulate therebetween to prevent overheating of the same, the remaining portion of the interior of said inner end contacting the box so as to support the latter.

2. A heating unit for an oven including, a firebox, and a flue engaging around the firebox for receiving and circulating hot gases through the oven, the flue having a contour different from that of said box, whereby the major portion of the box is spaced from the exterior of the box so as to permit circulation of fresh air therebetween, the remaining portion of the exterior of said box contacting the interior of the flue so as to be supported by the same.

3. A heating unit for an oven including, a firebox, a sinuous flue connected with the outlet end of the firebox for receiving and circulating hot gases through the oven, and means adjacent the outlet end of said box for by-passing a part of the hot gases to the flue intermediate its ends, whereby a more rapid initial heating of said flue is provided.

4. A heating unit for an oven including, a firebox mounted within the lower end of the oven at its central portion, and a sinuous metallic flue connected with the outlet end of the firebox and extending transversely across the floor of said oven on either side of said box for receiving and circulating hot gases back and forth across the lower end of the oven, whereby the interior of the same is rapidly and evenly heated, the inner end of the flue being angular in cross-section and the box being substantially cylindrical in cross-section, whereby said box is supported by the inner end of said flue without eliminating circulation of air therebetween.

5. A heating unit for an oven including, a transversely extending duct disposed in the lower portion of the oven, means for directing hot gases into one end of the duct, flues leading from the opposing end of said duct and covering substantially the cross-sectional area of the oven for distributing the heat from the gases evenly throughout the interior of said oven, and means for by-passing a portion of said gases from the intermediate portion of the duct to the flues, whereby the gases need not traverse the entire length of said duct to reach said flues.

6. A heating unit for an oven including, a transversely extending duct disposed in the lower portion of the oven and arranged to receive the products of combustion from the oven burner, flues leading from one end of said duct and covering substantially the cross-sectional area of the oven for distributing the heat from the products of combustion evenly throughout the interior of said oven, means for by-passing a portion of said gases from the intermediate portion of the duct to the flues, whereby the gases need not traverse the entire length of said duct to reach said flues, and means for controlling the by-passing means so that the amount of gases by-passed may be regulated.

7. A heating unit for an oven including, a pair of transversely extending ducts disposed in the lower portion of the oven, a firebox engaging within one end of each duct for directing hot gases thereinto, and a flue leading from one end of each duct and covering substantially the cross-sectional area of the oven for distributing the heat from the gases evenly throughout the interior of said oven, each firebox having an external contour different from that of its duct, whereby the major portion of the firebox is spaced from the internal surface of the duct so as to permit circulation of fresh air therebetween, the remaining portions of said firebox contacting the internal surface of said duct so as to be supported by the same.

8. A heating unit for an oven including a firebox, a metallic flue connected with the outlet end of the firebox for receiving and circulating hot gases through the oven, the outer portion of the flue having a plurality of spaced openings formed therein for by-passing a portion of the hot gases into the interior of said oven, whereby the heat of said gases may be utilized to maintain a constant temperature within said oven, and an elongate slide valve mounted within the flue for controlling the size of the openings so that the amount of gases by-passed therethrough may be regulated.

9. A heating unit for an oven including, a transversely extending duct disposed in the lower central portion of the oven and arranged to receive the products of combustion from the oven burner, flues leading from one end of said duct and covering substantially the cross-sectional area of the oven for distributing the heat from the products of combustion evenly throughout the interior of said oven, the outer end portion of each flue having a plurality of spaced openings formed therein for by-passing a portion of said products of combustion into the interior of the oven, an elongate slide valve mounted within each flue adjacent the openings therein for controlling the amount of the product of combustion by-passed through said openings, and means carried by the valve for preventing the escape of a portion of said products of combustion from the oven, whereby the heat of the products of combustion may be fully utilized.

10. A heating unit for an oven including, a firebox, a metallic flue connected with the outlet end of the firebox for receiving and circulating hot gases through the oven, and means for conducting fresh air to be heated to the central portion of the interior of said oven adjacent the exterior of the inner portion of the flue.

11. A heating unit for an oven including, a transversely extending duct disposed in the lower portion of the oven and arranged to receive the products of combustion from the oven burner, flues leading from one end of said duct and covering substantially the cross-sectional area of the oven for distributing the heat from the products of combustion evenly throughout the interior of said oven, and means in the lower portion of said oven for conducting fresh air from the exterior of the oven to the interior thereof, whereby said air may be immediately heated exteriorly of the duct and oven burner and circulated throughout the upper portion of the oven interior.

12. A heating unit for an oven including, a transversely extending duct disposed in the lower portion of the oven and arranged to receive the products of combustion from the oven burner, flues leading from one end of said duct and covering substantially the cross-sectional area of the oven for distributing the heat from the products of combustion evenly throughout the interior of said oven, means for conducting fresh air to be heated to the central portion of the interior of said oven adjacent to and exteriorly of the duct, and means within the flues for preventing the escape of a portion of said products of combustion from the oven and for by-passing the same into the interior thereof, whereby the heat of the products of combustion may be fully utilized.

13. A heating unit for an oven including, a firebox, and a flue engaging around the firebox for receiving and circulating hot gases through the oven, the firebox being removably mounted within the flue and having an external contour different from the internal contour of said flue, whereby the major portion of the exterior of the box is spaced from the internal surface of said flue so as to permit circulation of fresh air therebetween and the remaining portion of the box exterior contacting the flue interior so as to be supported by the same.

14. A heating unit for an oven including, a transversely extending duct disposed in the lower portion of the oven, a firebox engaging within one end of the duct for directing hot gases thereinto, flues leading from the opposing end of the said duct and covering substantially the cross-sectional area of the oven for distributing the heat from the gases evenly throughout the interior of said oven, and means for by-passing a portion of said gases from the intermediate portion of the duct to the flues, whereby the gases need not traverse the entire length of said duct to reach said flues.

15. A heating unit for an oven including, a firebox mounted within the lower portion of the oven, a transversely-extending duct connected with the outlet end of the firebox for receiving the products of combustion, flues leading from one end of said duct and covering substantially the cross-sectional area of the oven for distributing the heat from the products of combustion evenly throughout the interior of said oven, means for by-passing a portion of said gases from the intermediate portion of the duct to the flues, whereby the gases need not traverse the entire length of said duct to reach said flues, and means for controlling the by-passing means so that the amount of gases by-passed may be regulated.

16. A heating unit for an oven including, a duct disposed in the lower portion oven and arranged to receive hot gases from the oven burner, a sinuous flue leading from one end of the duct and covering substantially the cross-sectional area of the oven for distributing the heat from the gases evenly throughout the interior of said oven, and means for by-passing a portion of said gases from the intermediate portion of the duct to the flue, whereby the gases need not traverse the entire length of said duct to reach the flue.

17. A heating unit for an oven including, a duct disposed in the lower portion oven and arranged to receive hot gases from the oven burner, a sinuous flue leading from one end of the duct and covering substantially the cross-sectional area of the oven for distributing the heat from the gases evenly throughout the interior of said oven, means for by-passing a portion of said gases from the intermediate portion of the duct to the flue, whereby the gases need not traverse the entire length of said duct to reach the flue, and means for controlling the by-passing means so that the amount of gases by-passed may be regulated.

18. A heating unit for an oven including, a duct disposed in the lower portion oven and arranged to receive hot gases from the oven burner, a sinuous flue leading from one end of the duct and covering substantially the cross-sectional area of the oven for distributing the heat from the gases evenly throughout the interior of said oven, and means for establishing communication between the intermediate portion of the duct and flue, whereby a portion of said gases may be by-passed to said flue and need not traverse the entire length of said duct to reach the flue.

19. A heating unit for an oven including, a duct disposed in the lower portion oven and arranged to receive hot gases from the oven burner, a sinuous flue leading from one end of the duct and covering substantially the cross-sectional area of the oven for distributing the heat from the gases evenly throughout the interior of said oven, and a conduit for establishing communication between the intermediate portion of the duct and flue, whereby a portion of said gases may be by-passed to said flue and need not traverse the entire length of said duct to reach the flue.

LOUIS D. HOULIS.